United States Patent
Pursifull

(10) Patent No.: US 9,140,178 B2
(45) Date of Patent: Sep. 22, 2015

(54) METHOD FOR PURGING CHARGE AIR COOLER CONDENSATE DURING A COMPRESSOR BYPASS VALVE EVENT

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 272 days.

(21) Appl. No.: 13/852,950

(22) Filed: Mar. 28, 2013

(65) Prior Publication Data

US 2014/0290630 A1   Oct. 2, 2014

(51) Int. Cl.
| | |
|---|---|
| *F02B 39/00* | (2006.01) |
| *F02B 29/04* | (2006.01) |
| *F02B 37/16* | (2006.01) |
| *F02M 25/07* | (2006.01) |

(52) U.S. Cl.
CPC ............. *F02B 29/0468* (2013.01); *F02B 37/16* (2013.01); *F02M 25/0706* (2013.01); *F02D 2200/0418* (2013.01); *Y02T 10/144* (2013.01); *Y02T 10/146* (2013.01)

(58) Field of Classification Search
CPC .. F02B 29/04; F02B 29/0406; F02B 29/0418; F02B 29/0468; F02B 29/0475; F02B 29/0493; F02B 2029/0487; F02B 37/00; F02B 37/16; F02B 37/18; F02B 37/183; F02B 33/446; F02M 25/0707; F02C 6/12; F05B 2220/40; F02N 11/00; F02N 15/00; Y02T 10/144

USPC ................... 60/611, 599, 605.2; 123/568.12, 123/568.22; 62/285
See application file for complete search history.

(56) References Cited

U.S. PATENT DOCUMENTS

| | | | |
|---|---|---|---|
| 4,563,983 A * | 1/1986 | Hayashi et al. | 123/41.21 |
| 6,367,256 B1 * | 4/2002 | McKee | 60/605.2 |
| 6,527,821 B2 * | 3/2003 | Liu et al. | 55/385.3 |
| 6,681,171 B2 * | 1/2004 | Rimnac et al. | 701/108 |
| 7,007,680 B2 * | 3/2006 | Tussing et al. | 123/568.12 |
| 7,219,661 B2 * | 5/2007 | Aberle | 123/568.12 |
| 7,251,937 B2 * | 8/2007 | Appleton | 60/599 |
| 7,530,336 B2 * | 5/2009 | Brecheisen, II | 123/25 A |
| 7,926,272 B2 * | 4/2011 | Takemoto | 60/605.2 |
| 7,980,076 B2 * | 7/2011 | Buia et al. | 60/599 |
| 8,061,135 B2 * | 11/2011 | Rutherford | 60/599 |
| 8,191,366 B2 | 6/2012 | Taylor | |
| 8,286,616 B2 * | 10/2012 | Clarke et al. | 123/568.21 |
| 8,371,276 B2 | 2/2013 | Pursifull et al. | |

(Continued)

FOREIGN PATENT DOCUMENTS

| | | |
|---|---|---|
| JP | S57151019 A | 9/1982 |
| WO | 2007069972 A1 | 6/2007 |

*Primary Examiner* — Audrey K Bradley
*Assistant Examiner* — Jason T Newton
(74) *Attorney, Agent, or Firm* — Julia Voutyras; Alleman Hall McCoy Russell & Tuttle LLP

(57) ABSTRACT

Methods and systems are provided for draining condensate from a charge air cooler during a compressor bypass valve event. In one example, an engine controller may open a drain valve in the charge air cooler in response to potential compressor surge conditions. Opening the drain valve may be further based on an amount of condensate in the charge air cooler and a required decrease in pressure at an outlet of the compressor during the compressor bypass valve event.

13 Claims, 5 Drawing Sheets

(56) References Cited

U.S. PATENT DOCUMENTS

| | | | |
|---|---|---|---|
| 2007/0107425 A1* | 5/2007 | Appleton | 60/599 |
| 2008/0190079 A1* | 8/2008 | Cerdes | 55/319 |
| 2009/0050117 A1* | 2/2009 | Tai et al. | 123/542 |
| 2010/0205949 A1* | 8/2010 | Bolda et al. | 60/309 |
| 2011/0094219 A1* | 4/2011 | Palm | 60/599 |
| 2011/0232598 A1* | 9/2011 | Harada et al. | 123/184.47 |
| 2013/0019845 A1* | 1/2013 | Meyer | 123/542 |
| 2013/0291536 A1* | 11/2013 | Koch et al. | 60/599 |
| 2014/0041381 A1* | 2/2014 | Kuske et al. | 60/602 |

* cited by examiner

METHOD FOR PURGING CHARGE AIR COOLER CONDENSATE DURING A COMPRESSOR BYPASS VALVE EVENT

BACKGROUND/SUMMARY

Turbocharged and supercharged engines may be configured to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire and combustion instability.

One approach to address condensate formation in the CAC may involve draining condensate from the CAC to the intake manifold of the engine. However, this method may decrease boost pressure to the engine, thereby reducing engine performance.

In one example, the issues described above may be addressed by a method for draining condensate from a CAC in response to a compressor bypass valve event. Specifically, a drain valve positioned in the CAC may be opened before and/or during the compressor bypass valve event. In one example, the drain valve may be opened in response to opening the compressor bypass valve. In another example, the drain valve may be opened in response to a potential compressor surge event. The potential compressor surge event may be indicated by one or more of a throttle inlet pressure greater than a threshold pressure and a tip-out. Further, before and/or during the compressor bypass valve event, condensate may be drained from the CAC to an alternate location in the engine system. Then, after a duration, the CAC drain valve may be closed. In one example, the duration may be based on a required decrease in pressure at an outlet of the CAC during the compressor bypass valve event.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
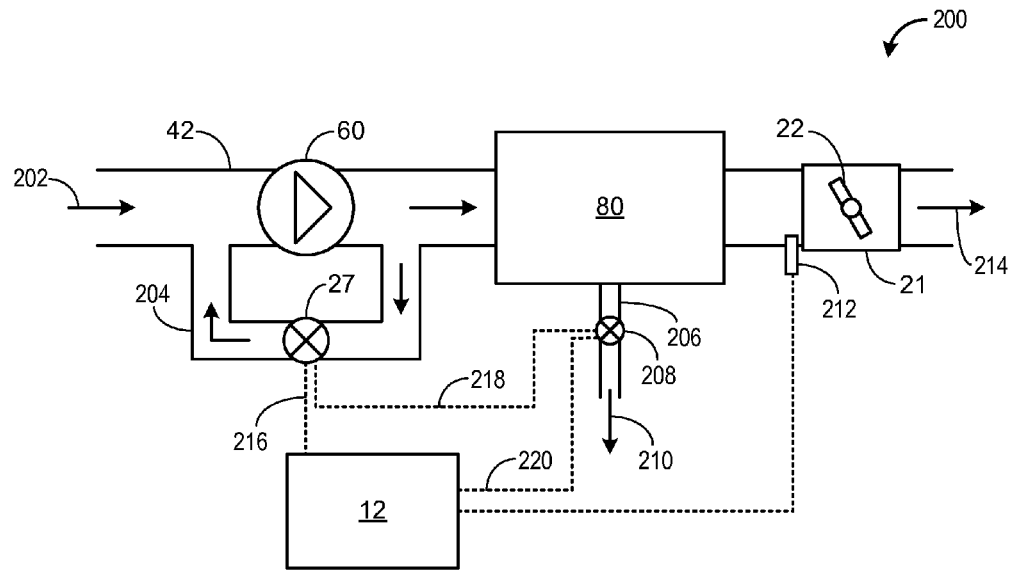
FIG. 2 is a schematic diagram of a first embodiment of a charge air cooler drain valve.
Figure 3:
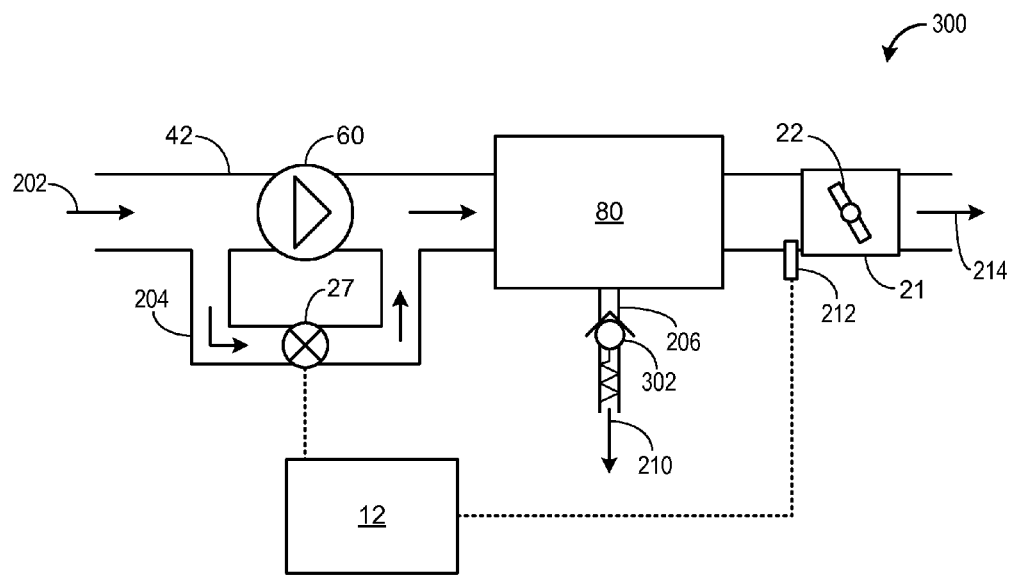
FIG. 3 is a schematic diagram of a second embodiment of a charge air cooler drain valve.
Figure 5:
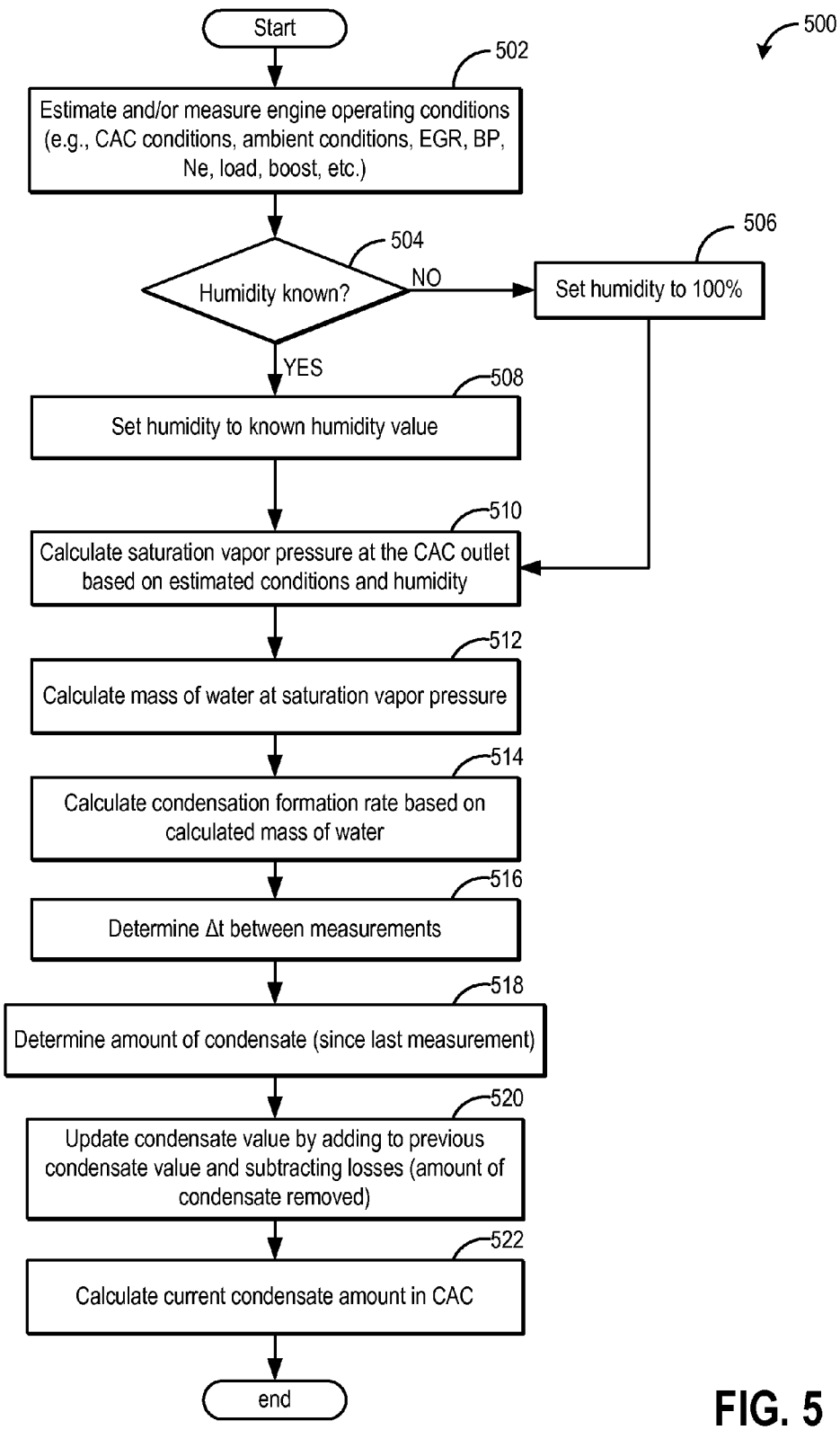
FIG. 5 shows a flow chart illustrating a method for inferring a condensate level at the charge air cooler.
Figure 6:
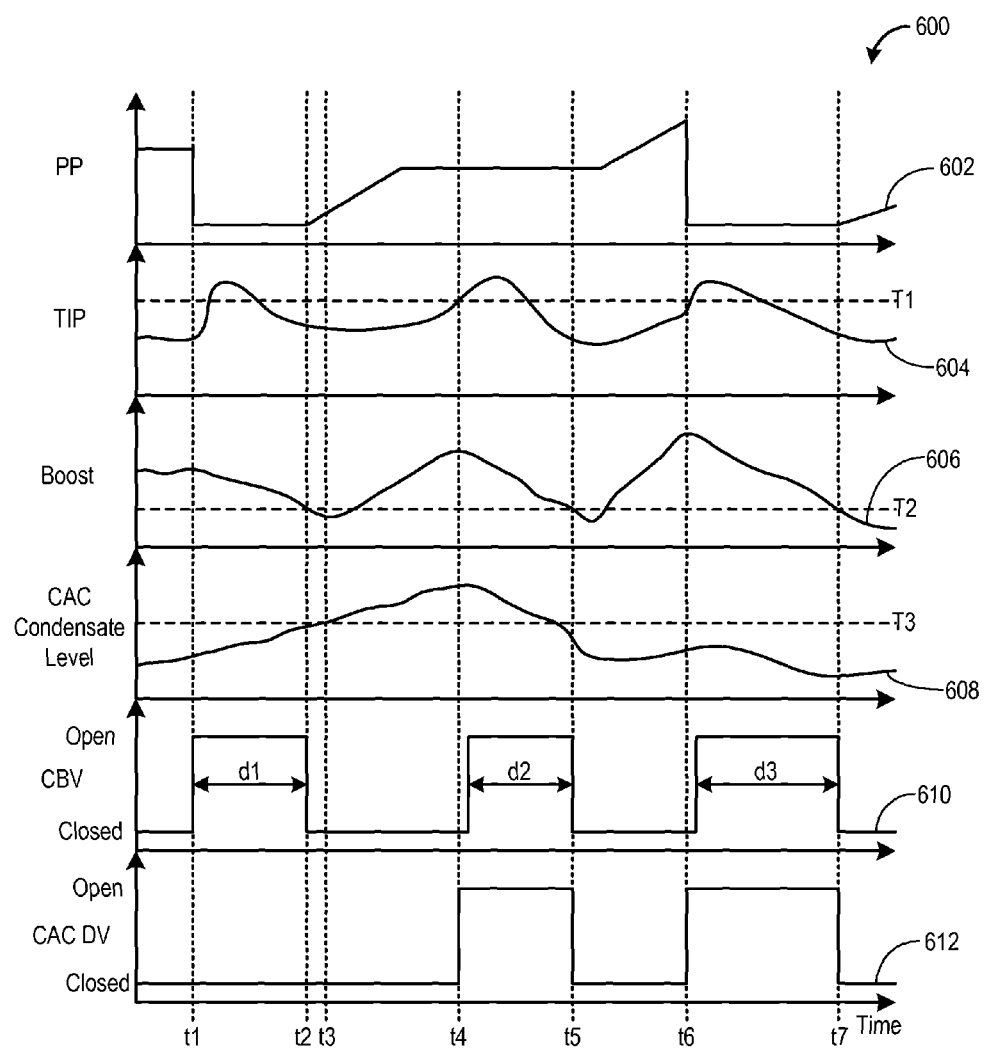
FIG. 6 shows a graph illustrating example CAC condensate purging events, via opening a charge air cooler drain valve, in response to compressor bypass valve events

The following description relates to systems and methods for draining condensate from a charge air cooler (CAC) during a compressor bypass valve (CBV) event, including adjustment of the CBV. That CBV event may be predicated based on an imminent NVH event or a need to bypass flow to avoid surge. Further, the CBV adjustment may be responsive to surge. A CAC in an engine system, such as the engine system of FIG. 1, may include a CAC drain valve (DV). FIGS. 2-3 show example embodiments of the CAC DV. By opening the CAC DV, condensate may drain from the CAC. However, when draining condensate, pressure within the CAC may decrease, thereby decreasing boost pressure provided to the engine. As a result, engine output torque may decrease. Instead, condensate may be drained from the CAC during a CBV when boost pressure is already reduced when opening the CBV. A method for draining condensate from the CAC in response to a CBV event is presented at FIG. 4. Draining condensate from the CAC during a CBV event may be further based on an amount of condensate in the CAC. FIG. 5 presents a method for determining the amount or level of condensate in the CAC. Example CAC purging events in response to engine operating conditions indicating a CBV event are shown at FIG. 6.

Figure 1:
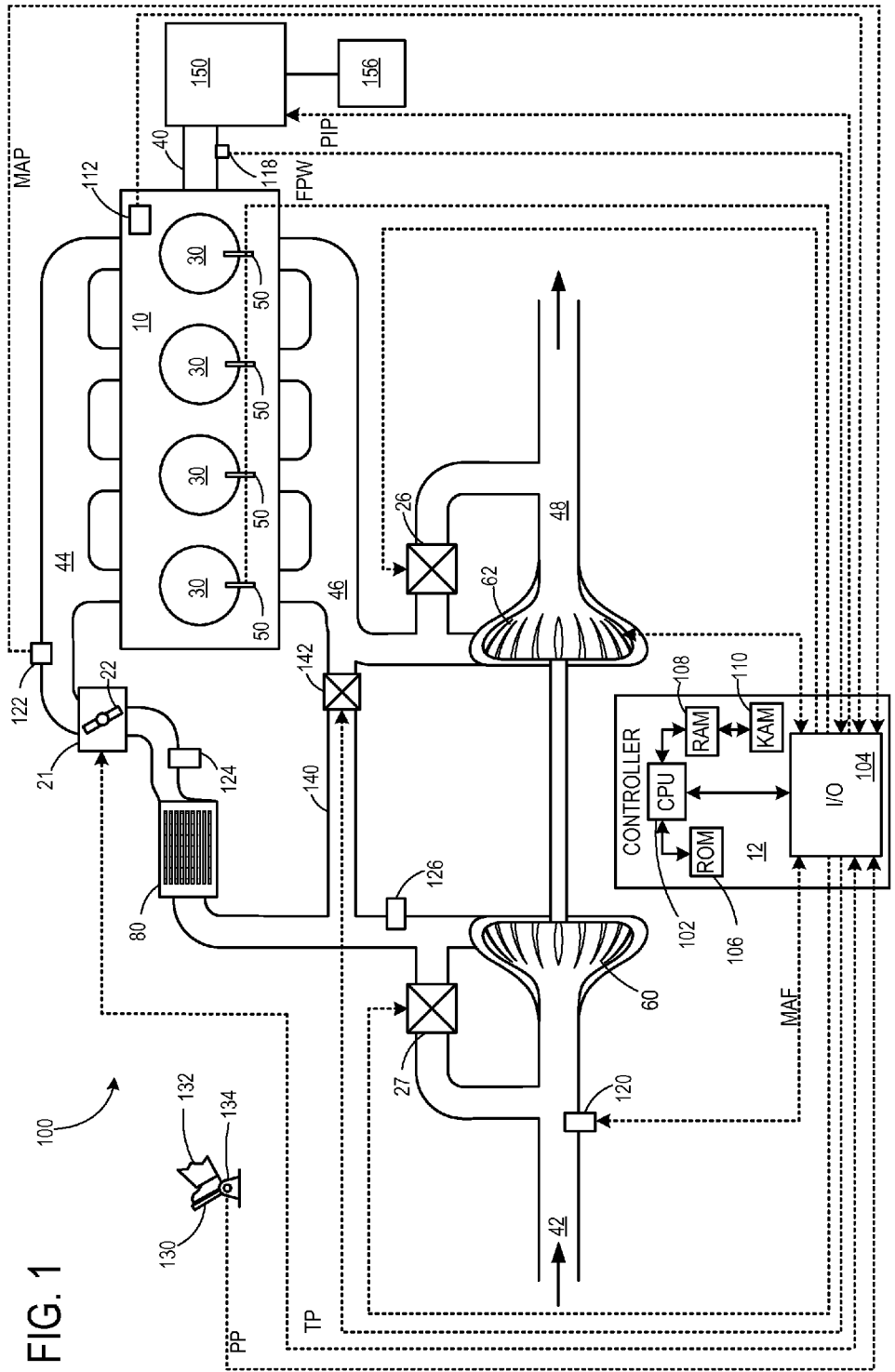
FIG. 1 is a schematic diagram of an example engine system including a charge air cooler.

FIG. 1 is a schematic diagram showing an example engine system 100, including an engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. As such, the pedal position signal may indicate a tip-in (e.g., sudden increase in pedal position), a tip-out (e.g., sudden decrease in pedal position or release of the accelerator pedal), and additional driving conditions.

Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel 156 of a vehicle via an intermediate transmission system 150. Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor bypass valve (CBV) 27 configured to divert intake air around compressor 60. Wastegate 26 and/or CBV 27 may be controlled by controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. In yet other embodiments, the CAC 80 may be a variable volume CAC. Hot charge air from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be purged via a drain valve in the CAC (shown in FIGS. 2-3) during selected engine operating conditions, such as during compressor bypass valve events. Thus, as elaborated herein with reference to FIGS. 2-6, condensate may be drained from the CAC by opening the CAC drain valve during compressor bypass valve events.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature and/or pressure sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by microprocessor unit 102 for performing the methods described below as well as other variants that are anticipated but not specifically listed. Example routines are described herein at FIGS. 4-6.

Turning now to FIG. 2, a schematic 200 of a portion of an engine system, such as the engine system 100 shown in FIG. 1, is shown. As such, engine components introduced in FIG. 1 may be included in the schematic 200. Specifically, the schematic 200 shows intake air 202 traveling through the intake passage 42. A compressor bypass passage 204 for diverting air around the compressor 60 is coupled between the intake passage 42, downstream of the compressor and upstream of the CAC 80, and the intake passage 42, upstream of the compressor 60. Further, the compressor bypass passage 204 includes the compressor bypass valve (CBV) 27 for controlling flow through the compressor bypass passage 204. For example, the controller 12 may increase the opening of the CBV 27 (through electrical linkage 216) to increase flow through the compressor bypass passage 204, thereby decreasing pressure downstream of the compressor (e.g., boost pressure) and reducing the likelihood of compressor surge. In one example, opening the CBV 27 may be referred to as a CBV event. Opening the CBV 27 may include fully opening the CBV 27 (e.g., opening to a maximal amount of opening) and/or partially opening the CBV to a position between closed and fully open. In another example, the controller 12 may decrease the opening of the CBV 27 to decrease flow through the compressor bypass passage 204. For example, after a CBV event, the controller 12 may close the CBV 27, thereby stopping flow through the compressor bypass passage 204.

As shown in FIG. 2, the CAC 80 may include a drain tube 206 (e.g., drain conduit) positioned within the CAC 80. In one example, the drain tube 206 may be positioned at a bottom, with respect to a surface on which the vehicle sits, of the CAC 80. As such, condensate within the CAC 80 may accumulate at the bottom of the CAC 80, near the drain tube 206. The drain tube 206 includes a drain valve 208 for controlling a flow of condensate from the CAC and through the drain tube 206. The drain valve 208 may be referred to herein as the CAC drain valve (CAC DV).

Specifically, opening or closing the drain valve may adjust the amount of condensate drained, or purged, from the CAC 80. For example, by increasing opening of the CAC DV 208, condensate 210 may drain from the CAC 80, through the drain tube 206, and to an alternate location. The alternate location may include one or more of interior to the exhaust (e.g., an interior of an exhaust passage), on a highly heated external engine location, the ground, and/or a holding tank. For example, the drain tube 206 may be coupled to a condensate holding tank. Condensate may then be drained from the holding tank to another location, such as the highly heated external engine location, under select engine operating conditions. The alternate locations listed above may be able to better handle the condensate (e.g., water or water vapor), thereby decreasing the risk of combustion instability and engine misfire.

In one example, the CAC DV 208 may be controlled by the controller 12 through electrical linkage 220. For example, the controller 12 may increase the opening of the CAC DV 208 to increase draining of condensate from the CAC 80, thereby reducing the amount of condensate within the CAC 80. Opening the CAC DV 208 may include fully opening the CAC DV 208 (e.g., opening to a maximal amount of opening) and/or partially opening the CAC DV 208 to a position between closed and fully open. In another example, the controller 12 may decrease the opening of the CAC DV 208 to decrease draining of condensate from the CAC 80. For example, after a CBV event, the controller 12 may close the CAC DV 208, thereby stopping condensate draining from the CAC 80.

In another example, the CAC DV 208 may be linked to the CBV 27 through a linkage 218. In this example, one actuator may open both the CBV 27 and the CAC DV 208. As such, the CAC DV 208 may open and close in response to the CBV 27 opening and closing. For example, when the CBV 27 opens, the CAC DV 208 may open. Conversely, when the CBV 27 closes, the CAC DV 208 may close. Further, an amount of opening of the CAC DV 208 may be proportional to an amount of opening of the CBV 27.

A compressor bypass valve event may occur in response to engine operating conditions. In one example, a throttle pressure, or throttle inlet pressure (TIP), over a threshold pressure may indicate a possible or imminent compressor surge event. As such, the controller 12 may open the CBV 27 in response to a TIP greater than the threshold pressure. A pressure sensor 212, as shown in FIG. 2, may measure the pressure at the inlet of the throttle 21 and send a signal of TIP to the controller 12. In one example, the pressure sensor 212 may be the pressure sensor 124 shown in FIG. 1. In another example, a tip-out may indicate a possible or imminent compressor surge event. Further, a tip-out may be indicated by a sudden decrease in pedal position. As such, the controller 12 may open the CBV 27 in response to a tip-out. In yet another example, the controller 12 may open the CBV in response to the compressor surging. For example, if the surge event was not predicted by a tip-out, TIP, or an alternate engine operating condition, the compressor may begin surging. In response, the controller may open the CBV to reduce boost pressure and stop compressor surging.

In an alternate embodiment, as shown in FIG. 3, the CAC DV may be a pressure relief valve. Specifically, FIG. 3 shows a schematic 300 wherein the CAC DV is a pressure relief valve 302. As such, the pressure relief valve 302 opens automatically in response to a threshold pressure. For example, when a TIP increases above a threshold pressure, the pressure relief valve 302 may open, thereby draining condensate from the CAC 80. In one example, the threshold pressure may be set such that the pressure relief valve 302 opens before and during a compressor bypass valve event (e.g., when the CBV 27 is open).

The systems of FIGS. 1-3 provide for an engine system including an intake throttle positioned upstream of an intake manifold of an engine, a compressor having a compressor bypass passage, the compressor bypass passage including a compressor bypass valve, and a charge air cooler positioned downstream of the compressor and upstream of the intake throttle, the charge air cooler having a drain valve operable to drain condensate from the charge air cooler. The engine system may further include a controller with computer readable instructions for opening the drain valve to drain condensate from the charge air cooler in response to a compressor bypass event. The compressor bypass event may include opening the compressor bypass valve in response to one or more of an inlet pressure at the intake throttle being greater than a threshold pressure, a tip-out, and compressor surge. In one example, the drain valve may be positioned at a bottom of the charge air cooler and opening the drain valve drains condensate from the charge air cooler to one or more of an interior of an exhaust passage, a highly heated external engine location, ground, and a holding tank.

As discussed above, the controller may also control draining of condensate from the CAC. However, opening the CAC DV during normal engine operation may reduce boost pressure, thereby reducing power output of the engine. Instead, condensate may be drained from the CAC during periods when boost pressure may be decreased. For example, condensate may be drained from the CAC during a compressor bypass valve event. In another example, condensate may be drained from the CAC before and during the compressor bypass valve event. In yet another example, condensate may be drained from the CAC before the compressor bypass valve event.

As discussed above, in one example, the controller may actuate the CAC DV to open in response to the CBV opening or about to open. Alternatively, the controller may actuate the CAC DV to open in response to the TIP increasing above the threshold pressure, a tip-out, and/or the compressor surging. In another example, the controller may actuate the CBV and CAC DV to open together, through one actuator, in response to the TIP increasing above the threshold pressure, a tip-out, and/or the compressor surging.

Further, opening the CAC DV before and/or during a compressor bypass valve event may help to reduce boost pressure (e.g., pressure at the outlet of the compressor). As a result, the compressor bypass valve event may be shorter than if the CAC DV had not been opened. For example, the controller may determine that boost pressure must be reduced by a first amount to stop or avoid compressor surging. Therefore, a duration of the compressor bypass valve event, or duration of opening the CBV, may be determined such that the boost pressure is reduced by the first amount. However, opening the CAC DV in addition to opening the CBV may further reduce boost pressure. As such, the duration of the compressor bypass event may be reduced. In this way, opening the CAC DV and draining condensate during the compressor bypass valve event may further reduce boost pressure, thereby decreasing the duration of the compressor bypass valve event.

In some examples, the CAC DV may be opened before and/or during the CBV event only when a level (or amount) of condensate in the CAC is greater than a threshold level. A method for determining the amount of condensate in the CAC is presented at FIG. 4. In other examples, the CAC DV may be opened before and/or during the CBV event even if the condensate level in the CAC is below the threshold level. For example, as described above, the controller may determine a required pressure (e.g., boost pressure) decrease in order to decrease or avoid pressure surge. If the required pressure decrease is greater than a threshold pressure drop (e.g., decrease), both the CBV and the CAC DV may be opened during the CBV event. The threshold pressure decrease may be based on an allowable duration of the CBV event. For example, if the duration of opening the CBV is too long (e.g., greater than the allowable duration), engine performance may be reduced. As such, by opening the CAC DV when the required pressure decrease is greater than the threshold pressure drop, the CBV and the CAC DV may both be opened for a shorter duration (e.g., a duration shorter than the allowable duration).

Opening the CAC DV during a CBV event may include opening the CAC DV a duration or amount of time before opening the CBV. As such, the increased pressure in the CAC may help to start the draining of condensate from the CAC once the CAC DV opens. Then, after condensate draining has begun, the controller may open the CBV to further decrease boost pressure and reduce the risk of compressor surge and/or reduce or avoid audible noise in the engine.

In this way, condensate may be drained from a charge air cooler in response to a compressor bypass valve event. Specifically, draining condensate from the charge air cooler may include opening a drain valve positioned at the charge air cooler. In one example, the drain valve may be opened during the compressor bypass valve event. In another example, the drain valve may be opened before the compressor bypass event. After a duration, the drain valve may be closed, the duration based on a required pressure decrease during the compressor bypass valve event. The compressor bypass valve event may include opening a compressor bypass valve in response to one or more of a throttle inlet pressure greater than a threshold pressure, a tip-out, and a compressor surge. In one example, the drain valve may be opened in response to opening the compressor bypass valve. In another example, the drain valve may be opened in response to a potential compressor surge event, the potential compressor surge event indicated by one or more of a throttle inlet pressure greater than a threshold pressure and a tip-out. Further, condensate may be drained condensate from the charge air cooler to one or more of an interior of an exhaust passage, a highly heated external engine location, ground, and a holding tank.

Figure 4:
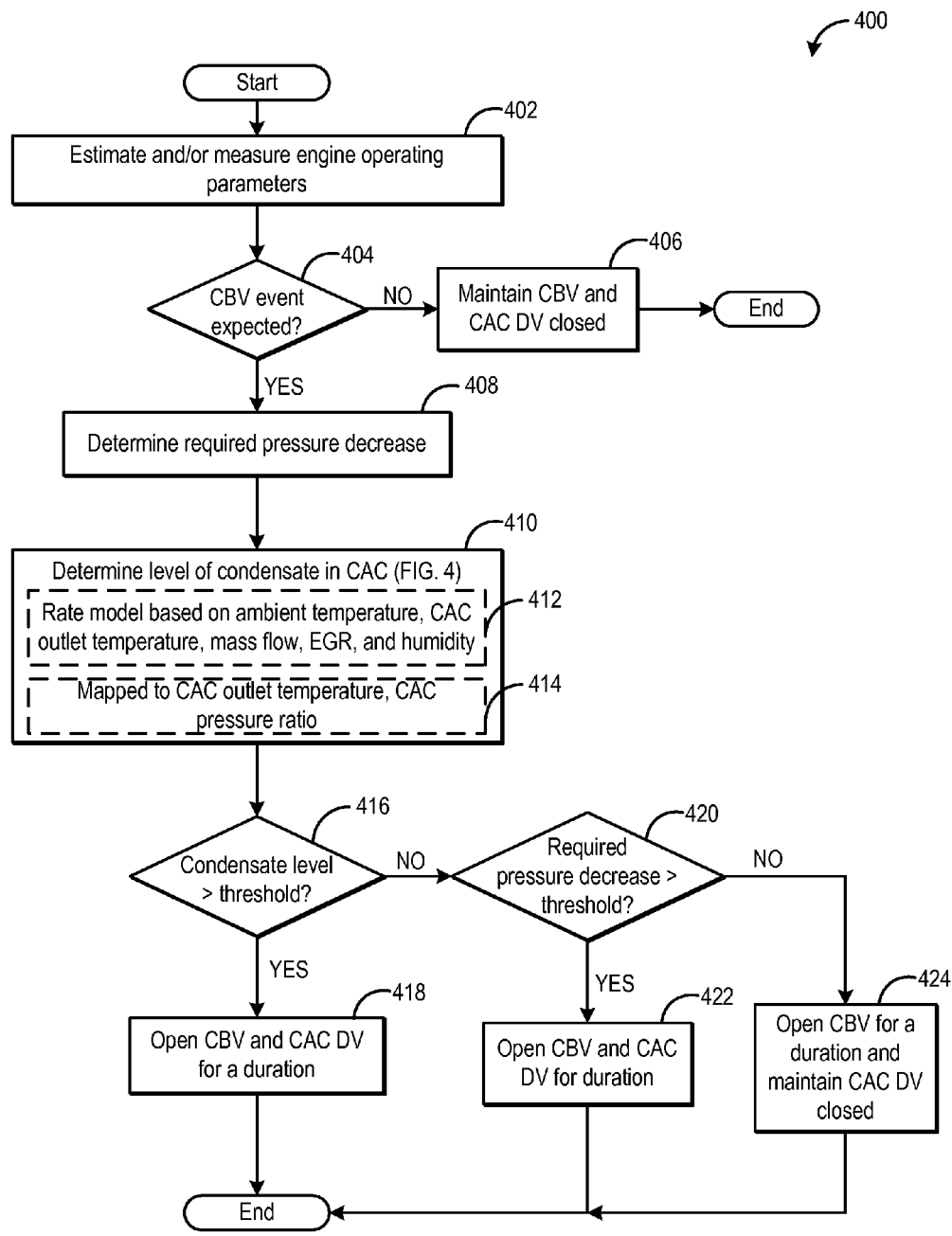
FIG. 4 shows a flow chart illustrating a method for adjusting a compressor bypass valve and a charge air cooler drain valve during a compressor bypass valve event.

Turning now to FIG. 4, a method 400 is shown for adjusting a compressor bypass valve (CBV) and a CAC drain valve (CAC DV) during a CBV event. In one example, the method 400 is executable by the controller 12 shown in FIGS. 1-3. The method begins at 402 by estimating and/or measuring engine operating conditions. Engine operating conditions may include engine speed and load, boost pressure, throttle pressure or throttle inlet pressure (TIP), pedal position, mass air flow, MAP, EGR flow, engine temperature, torque demand, charge air cooler conditions (inlet temperature, outlet temperature, inlet pressure, outlet pressure, flow rate through the cooler, etc.), etc.

At 404, the method includes determining if a CBV event is expected or imminent. In one example, determining if a CBV event is expected may include determining if a TIP is greater than a threshold pressure. In another example, determining if a CBV event is expected may include determining if there is a tip-out. Determining if there is a tip-out may include determining if there is a sudden decrease in pedal position. In another example, the method at 404 may include determining if the compressor is surging. In yet another example, determining if a CBV event is expected may include determining if an NVH event is expected or if audible noise reduction is needed. If a CBV event is not expected, the controller may maintain the CBV closed and the CAC DV closed at 406. However, if a CBV event is expected, the method continues on to 408 to determine a required pressure decrease during the CBV event. For example, the required pressure decrease may be based on the pressure drop (or decrease) at the outlet of the compressor required to decrease or avoid compressor surge. The pressure difference across the compressor may decrease as the pressure at the outlet of the compressor decreases. The pressure at the outlet of the compressor may be a boost pressure estimated and/or measured by a boost pressure sensor, such as the boost pressure sensor 126 shown in FIG. 1. As such, the required pressure decrease at 408 may be a required decrease in boost pressure.

At 410, the level of condensate at the CAC may be determined. This may include retrieving details such as ambient air temperature, ambient air humidity, inlet and outlet charge air temperature, inlet and outlet charge air pressure, and air mass flow rate from a plurality of sensors and determining the amount of condensate formed in the CAC based on the retrieved data. In one example, at 412, and as further elaborated at the model of FIG. 5, the rate of condensate formation within the CAC may be based on ambient temperature, CAC outlet temperature, mass flow, EGR, and humidity. In another example, at 414, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

At 416, the method includes determining if the condensate level at the CAC is higher than a threshold level. As such, the threshold level may correspond to an amount of condensate above which draining of the condensate is required to reduce misfire resulting from the slow burn rate in the engine induced by the water ingestion. If the condensate level in the CAC is greater than the threshold level, the controller opens the CBV and the CAC DV at 418 to decrease boost pressure (e.g., pressure at the outlet of the compressor) and simultaneously drain condensate from the charge air cooler. Opening the CBV and the CAC DV at 418 may include first opening the CAC DV to begin condensate draining and then opening the CBV. For example, the controller may open the CAC DV and then, after an amount of time (e.g., duration), the controller may open the CBV while the CAC DV remains open. The controller opens the CBV and the CAC DV at 418 for a duration. The duration may be based on the required decrease in boost pressure (e.g., required pressure decrease determined at 408). For example, the duration may increase as the required decrease in boost pressure increases. Alternatively or additionally, the duration may be based on the amount of condensate in the CAC. For example, the duration may increase as the amount of condensate above the threshold condensate level increases. Further, the duration at 418 may be shorter than if only the CBV were opened. As discussed above, opening the CAC DV further decreases boost pressure, thereby decreasing the duration in which the CAC DV and the CBV must be open to reduced boost pressure by the required amount. Once the CBV and CAC DV are open for the duration, the controller closes both the CBV and the CAC DV.

As discussed above, the controller may first open the CAC DV to drain condensate and consequently partially reduce boost pressure. The controller may then open the CBV to further reduce the boost pressure by the required amount. In this example, the CAC DV may be opened for a duration before opening the CBV. The duration may be based on the time it takes to begin condensate draining and/or reduce condensate by a certain amount. As such, the CAC DV may be opened, thereby draining condensate, before a CBV event and prior to opening the CBV.

In an alternate embodiment, the controller may simultaneously open and close the CAC DV and the CBV. In another embodiment, the controller may open and/or close the CBV and the CAC DV may subsequently open and/or close. For example, in this embodiment, one actuator may control both the CBV and the CAC DV. Specifically, the controller may actuate the CBV through the one actuator, and a linkage between the CBV and the CAC DV may subsequently actuate the CAC DV. In yet another embodiment, the controller may actuate the CAC DV in response to the CBV opening and/or closing. In another embodiment, if the CAC DV is a pressure relief valve, the CAC DV may open automatically in response to a TIP increasing above a threshold pressure.

Returning to 416, if the condensate level is not above the threshold level, the method proceeds to 420. At 420, the controller determines if the required pressure decrease is greater than a threshold pressure decrease. As discussed above, the threshold pressure decrease may be based on an allowable duration of the CBV event. For example, if the duration of opening the CBV is too long (e.g., greater than the allowable duration), engine performance may be reduced. The threshold pressure decrease may be further based on a compressor surge level. For example, if the compressor is surging and the pressure needs to be reduced rapidly, opening the CBV and the CAC DV together may more quickly reduce the boost pressure and reduce and/or stop compressor surge.

Thus, if the required pressure decrease is greater than the threshold pressure decrease at 420, both the CBV and the CAC DV may be opened at 422. As discussed above at 418, the CBV and the CAC DV may be opened for a duration based on the required pressure decrease. In some examples, the duration at 422 may be longer than the duration at 418 if the required pressure decrease is larger. However, the duration of opening the CBV and the CAC DV at 422 may be shorter than if only the CBV were opened at 422. As discussed above, opening the CBV and the CAC DV at 422 may include opening the CAC DV a duration prior to opening the CBV. In this way, condensate draining may start before opening the CBV. Returning to 422, once the CBV and CAC DV are open for the duration, the controller closes both the CBV and the CAC DV.

Returning to 420, if the required pressure decrease is at or less than the threshold pressure decrease, the controller may open the CBV at 424 while maintaining the CAC DV closed 424. As such, boost pressure may decrease while the CBV is open. However, no condensate may drain from the CAC. Alternatively, if the CBV event was due to an imminent NVH event, audible noise may be avoided or reduced from opening the CBV at 424. After a duration, the controller may close the CBV. As discussed above, the duration may be based on the required pressure drop. Further, the duration may additionally or alternatively be based on an amount of required noise reduction. Alternatively at 420, the CAC DV may also be opened, unless opening the CAC DV may degrade engine system performance.

FIG. 5 illustrates a method 500 for estimating the amount of condensate stored within a CAC. Based on the amount of condensate at the CAC relative to a threshold value, condensate draining routines, such as those discussed at FIG. 4, may be initiated during or before a compressor bypass valve event.

The method begins at 502 by determining the engine operating conditions. These may include, as elaborated previously at 402, ambient conditions, CAC conditions (inlet and outlet temperatures and pressures, flow rate through the CAC, etc.), mass air flow, MAP, EGR flow, engine speed and load, engine temperature, boost, etc. Next, at 504, the routine determines if the ambient humidity is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set to 100% at 506. However, if the humidity is known, the known humidity value, as provided by the humidity sensor, may be used as the humidity setting at 508.

The ambient temperature and humidity may be used to determine the dew point of the intake air, which may be further affected by the amount of EGR in the intake air (e.g., EGR may have a different humidity and temperature than the air from the atmosphere). The difference between the dew point and the CAC outlet temperature indicates whether condensation will form within the cooler, and the mass air flow may affect how much condensation actually accumulates within the cooler. At 510, an algorithm may calculate the saturation vapor pressure at the CAC outlet as a function of the CAC outlet temperature and pressure. The algorithm then calculates the mass of water at this saturation vapor pressure at 512. Finally, the condensation formation rate at the CAC outlet is determined at 514 by subtracting the mass of water at the saturation vapor pressure condition at the CAC outlet from the mass of water in the ambient air. By determining the amount of time between condensate measurements at 516, method 500 may determine the amount of condensate within the CAC since a last measurement at 518. The current condensate amount in the CAC is calculated at 522 by adding the condensate value estimated at 518 to the previous condensate value and then subtracting any condensate losses since the last routine (that is, an amount of condensate removed. for example, via purging routines) at 520. Condensate losses may be assumed to be zero if the CAC outlet temperature was above the dew point. Alternatively, at 520, the amount of condensate removed may be modeled or determined empirically as a function of air mass and integrated down with each software task loop (that is, with each run of routine 500).

As such, the method of FIG. 5 may be used by the controller during the routine of FIG. 4 to use a modeling method for estimating the amount of condensate at the CAC. In alternate embodiments, the engine control system may use a mapping method to map the amount of condensate at the CAC to a CAC inlet/outlet temperature, an ambient humidity, and an engine load. For example, the values may be mapped and stored in a look-up table that is retrieved by the controller during the routine of FIG. 4 (at 414), and updated thereafter.

FIG. 6 shows example CAC condensate purging events, via the CAC drain valve, in response to compressor bypass valve events. Specifically, graph 600 shows changes in pedal position (PP) at plot 602, changes in a throttle inlet pressure (TIP) at plot 604, changes in boost pressure (e.g., pressure at outlet of a compressor) at plot 606, changes in condensate level at the CAC at plot 608, changes in a position of the compressor bypass valve (CBV) at plot 610, and changes in a position of the CAC drain valve (DV) at plot 612. Time is represented along the x-axis of graph 600. As shown in graph 600, the CBV and the CAC DV may be adjusted between and open and a closed position. In alternate embodiments, the CBV and the CAC DV may be adjusted to a plurality of positions between fully open and fully closed. Additionally, a threshold boost pressure, T2, is shown at plot 606. The threshold boost pressure T2 may be a target pressure the boost pressure decreases to during a CBV event. As such, below a threshold boost pressure T2, surge may be stopped and the compressor may return to normal operation. In an alternate example, a different pressure or engine operating condition may be used by the controller to determine a required pressure decrease or duration of the compressor bypass valve event (e.g., duration of opening the CBV).

Prior to time t1, the CBV and the CAC DV may be closed (plots 610 and 612). Further, the CAC condensate level may be below a threshold level, T3 (plot 608), boost may be at a steady level (plot 606), TIP may be below a threshold pressure, T1 (plot 604), and PP may be at a steady level (plot 602). At time t1, PP may suddenly decrease, indicating a tip-out (plot 602). As a result, TIP may increase above the threshold pressure T1 (plot 604). The required decrease in pressure 614 (e.g., boost pressure) may be less than the threshold pressure difference. Additionally, the condensate level in the CAC may be below the threshold level T3 at time t1. In response to the condensate level in the CAC being below the threshold level T3 and the required pressure decrease being less than the threshold pressure difference, the controller may open the CBV (plot 610) and not open the CAC DV (plot 612). Opening the CBV causes the boost pressure to decrease (plot 606). After a first duration, d1, the controller closes the CBV (plot 610) at time t2. This may correspond to the boost pressure decreasing below the threshold boost pressure T3 (plot 606).

Between time t1 and time t2, the CAC condensate level may have been increasing. As such, at time t3 the CAC condensate level may increase over the threshold level T3 (plot 608). Then, at time t4 the TIP may increase over the threshold pressure T1 (plot 604). Further, the required pressure decrease 616 to avoid or reduce surge may be greater than the threshold pressure decrease at time t4. In response to the TIP over the threshold pressure T1 when the CAC condensate level is greater than the threshold level T3, the controller opens both the CBV and the CAC DV. The controller opens the CAC DV first at time t4 and then opens the CBV shortly after time t4. The CAC DV may be opened a duration prior to the CBV opening to start the condensate draining at a higher pressure. After a second duration, d2, the controller closes the CBV (plot 610) and the CAC DV (plot 612). The second duration d2 may correspond to the boost pressure decreasing below the threshold boost pressure T3 (plot 606). From time t4 to time t5, the CAC condensate level decreased, eventually decreasing below the threshold level T3 just before time t5.

At time t6, another CBV event occurs, indicated by a tip-out (plot 602). The CAC condensate level may still be below the threshold level T3 at time t6 (plot 608). However, the required pressure decrease 618 may be greater than the threshold pressure decrease at time t6 (plot 606). Thus, in response to the tip-out, when the CAC condensate level is greater than the threshold level T3 and the required pressure decrease is greater than the threshold pressure decrease, the controller opens both the CBV and the CAC DV. The controller again opens the CAC DV first at time t6 while the CBV remains closed. Then, shortly after time t6, the controller opens the CBV while the CAC DV is still open. During the opening of the CBV and the CAC DV, both the boost pressure and the CAC condensate level decrease. After a third duration, d3, the controller closes the CBV and the CAC DV. The third duration d3 may correspond to the boost pressure decreasing below the threshold boost pressure T3 (plot 606). Further, the third duration d3 may be greater than the second duration d2 since the required pressure decrease 618 at time t6 is greater than the required pressure decrease 616 at time t4.

As shown in graph 600, during a first condition, a compressor bypass valve may be opened in response to potential compressor surge conditions. As shown at time t1, the first condition includes when a condensate level in a charge air cooler is less than a threshold level and a required pressure decrease is less than a threshold pressure decrease. In an alternate example, the compressor bypass valve may be opened in response to audible engine noise or an imminent NVH event. During a second condition, the compressor bypass valve and the charge air cooler drain valve may be opened in response to potential compressor surge conditions. The second condition includes one of when a condensate level in a charge air cooler is greater than a threshold level (as shown at time t4) and when the condensate level in the charge air cooler is less than the threshold level and a required pressure decrease is greater than a threshold pressure decrease (as shown at time t6).

Potential compressor surge conditions may include one or more of a throttle inlet pressure over a threshold pressure (as shown at time t4) and a tip-out (as shown at time t1 and time t6). Further, the compressor bypass valve may be opened for a duration, the duration decreasing for one or more of a smaller required pressure decrease and when the charge air cooler drain valve is open during the opening of the compressor bypass valve. In one example, the required pressure decrease may be based on a pressure decrease at an outlet of the compressor required to decrease or avoid compressor surge. In one embodiment, the compressor bypass valve and the charge air cooler drain valve may open together with one actuator. In alternate embodiments, during the second condition, the charge air cooler drain valve may be opened before opening the compressor bypass valve.

In this way, condensate may be drained from a charge air cooler (CAC) during a compressor bypass valve (CBV) event. In one example, a CAC drain valve (DV) may be positioned in the CAC. When opening the CAC DV, condensate may drain from the CAC to an alternate location. During the CBV event, a CBV may be opened to reduce pressure at the outlet of the compressor (e.g., boost pressure), thereby reducing or avoiding compressor surge. When a condensate level in the CAC is greater than a threshold level, an engine controller may open the CAC DV during the CBV event. As such, the CBV and the CAC DV may be opened together to simultaneously reduce the pressure at the outlet of the compressor and condensate in the CAC. Even if the CAC condensate level is not greater than the threshold level, the CAC DV may be opened with the CBV during the CBV event. In this way, opening the CAC DV in addition to the CBV may further reduce pressure at the outlet of the compressor. As such, a duration of the CBV event may be reduced when opening both the CBV and the CAC DV. Using this method, CAC condensate may be purged from the CAC during engine operating conditions when boost pressure to the engine may be reduced without further decreasing engine performance.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
   draining condensate from a charge air cooler coupled to an engine in response to a compressor bypass valve event including, via an electronic controller:
   opening a compressor bypass valve,
   opening a drain valve responsive to opening the compressor bypass valve;
   closing the compressor bypass valve, and
   closing the drain valve responsive to closing the compressor bypass valve.

2. The engine method of claim 1, wherein the drain valve is positioned at the charge air cooler.

3. The engine method of claim 2, further comprising determining a level of condensate in the charge air cooler and adjusting opening of the drain valve responsive to the determined level of condensate in the charge air cooler.

4. The engine method of claim 1, further comprising sensing throttle inlet pressure, and opening the compressor bypass valve is in response to the throttle inlet pressure greater than a threshold pressure.

5. The engine method of claim 1, further comprising opening the drain valve in response to a potential compressor surge event, the potential compressor surge event determined by the electronic controller based on one or more of a sensed throttle inlet pressure greater than a threshold pressure and a tip-out determined based on a sensed pedal position.

6. The engine method of claim 1, further comprising draining condensate from the charge air cooler to one or more of an interior of an exhaust passage, a highly heated external engine location, ground, and a holding tank.

7. An engine method, comprising:
   determining a condensate level in a charge air cooler (CAC);
   opening a compressor bypass valve of an engine and not a CAC drain valve in response to a sensed pedal position when the determined level is below a threshold; and
   opening the compressor bypass valve and the CAC drain valve in response to the sensed pedal position when the determined level is above the threshold.

8. The engine method of claim 7, further comprising opening the compressor bypass valve in response to a sensed throttle inlet pressure.

9. The engine method of claim 7, wherein the first condition includes when the condensate level in the charge air cooler is less than a threshold level and a pressure decrease is less than a threshold pressure decrease.

10. The engine method of claim 9, wherein the pressure decrease is based on a pressure decrease at an outlet of a compressor.

11. An engine system, comprising:
    an intake throttle positioned upstream of an intake manifold of an engine;
    a compressor having a compressor bypass passage, the compressor bypass passage including a compressor bypass valve;
    a charge air cooler positioned downstream of the compressor and upstream of the intake throttle, the charge air cooler having a drain valve operable to drain condensate from the charge air cooler, wherein the compressor bypass valve and the charge air cooler drain valve open together with one actuator; and
    a controller with computer readable instructions for adjusting opening the drain valve and the compressor bypass valve responsive to sensed operating conditions.

12. The engine system of claim 11, wherein the controller further includes instructions for adjusting compressor bypass valve opening including opening the compressor bypass valve in response to one or more of a sensed inlet pressure at the intake throttle greater than a threshold pressure, and a tip-out sensed by a pedal position.

13. The engine system of claim 11, wherein the drain valve is positioned at a bottom of the charge air cooler.

* * * * *